(12) United States Patent
Dresen-Rausch et al.

(10) Patent No.: US 10,173,570 B2
(45) Date of Patent: Jan. 8, 2019

(54) SECURING ARRANGEMENT FOR FITTING A FOOT MAT

(71) Applicant: FORD GLOBAL TECHNOLOGIES, LLC, Dearborn, MI (US)

(72) Inventors: Johannes Dresen-Rausch, Cologne (DE); Florian Bonnet, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/462,713

(22) Filed: Mar. 17, 2017

(65) Prior Publication Data

US 2017/0282772 A1 Oct. 5, 2017

(30) Foreign Application Priority Data

Mar. 31, 2016 (DE) ........................ 10 2016 205 291

(51) Int. Cl.
*A47G 27/04* (2006.01)
*B60N 3/04* (2006.01)
*B62D 25/20* (2006.01)
*F16B 2/22* (2006.01)

(52) U.S. Cl.
CPC ............. *B60N 3/046* (2013.01); *A47G 27/04* (2013.01); *B62D 25/20* (2013.01); *F16B 2/22* (2013.01)

(58) Field of Classification Search
CPC .. A47G 27/04; A47G 27/045; A47G 27/0493; A47G 27/0412; A47G 27/0418; A47G 27/0431; B60N 3/04; B60N 3/046; B60N 3/044; B60R 13/0206; Y10T 16/118; Y10T 16/10; Y10T 16/05; Y10T 428/198; Y10T 428/24008; Y10T 428/24017; B62D 25/20; B62D 2/20; B62D 2/22; B62D 2/24
See application file for complete search history.

(56) References Cited

U.S. PATENT DOCUMENTS 1,412,970 A * 4/1922 Salfisberg .......... A44B 17/0005
24/356
2,174,521 A * 10/1939 Lancaster ................ A44B 1/30
24/105
3,326,509 A * 6/1967 Kuttler .................... F16B 21/20
248/176.1
(Continued)

FOREIGN PATENT DOCUMENTS

DE 3427640 A1 * 2/1986 ............ F16B 21/086
EP 0211966 A1 3/1987
(Continued)

*Primary Examiner* — Chuck Y Mah
(74) *Attorney, Agent, or Firm* — Vichit Chea; Brooks Kushman, P.C.

(57) ABSTRACT

A securing arrangement for fitting a foot mat to the floor of the foot space of a motor vehicle may have at least one securing element, wherein the securing element has an upper portion which is constructed for releasable fitting of the foot mat, and a pin which is connected to the upper portion and which is guided through an opening in the floor. There is further provided a clamping element which is locked to the pin at the side of the floor facing away from the upper portion in order to thus clamp the floor between the upper portion and the clamping element. At least one reinforcement plate is arranged between the clamping element and the floor.

15 Claims, 3 Drawing Sheets

(56) References Cited

U.S. PATENT DOCUMENTS

| | | | | |
|---|---|---|---|---|
| 3,572,218 | A | * | 3/1971 | Gumtow .................. F02M 1/14 411/918 |
| 4,286,807 | A | * | 9/1981 | Bachli ................... F16L 19/005 285/382.7 |
| 5,195,857 | A | * | 3/1993 | Hiramoto .............. F16B 21/086 411/173 |
| 5,384,939 | A | | 1/1995 | Weber |
| 5,390,397 | A | * | 2/1995 | Kremer .................. B60N 3/046 24/351 |
| 5,713,692 | A | * | 2/1998 | McCarrick ................ G09F 7/00 403/329 |
| 5,775,859 | A | * | 7/1998 | Anscher ................. B60N 3/046 411/344 |
| 6,777,060 | B2 | * | 8/2004 | Sehmer .................. B60N 3/046 16/4 |
| 7,128,328 | B2 | * | 10/2006 | Torongo .............. B60G 21/0551 280/124.107 |
| 7,945,992 | B2 | * | 5/2011 | Parisi .................... B60N 3/046 16/4 |
| 8,402,605 | B2 | * | 3/2013 | Courtin .................. B60N 3/046 16/4 |
| 9,517,712 | B1 | * | 12/2016 | Masanek, Jr. .......... B60N 3/046 |
| 2009/0235485 | A1 | | 9/2009 | Connor, Jr. |
| 2013/0313854 | A1 | | 11/2013 | Johnson et al. |

FOREIGN PATENT DOCUMENTS

| | | | | |
|---|---|---|---|---|
| FR | 2919540 | A1 | | 2/2009 |
| FR | 2950296 | A1 | * | 3/2011 ............. B60N 3/046 |
| FR | 2970446 | A1 | * | 7/2012 ............. B60N 3/046 |
| JP | 62055242 | A | * | 3/1987 |
| JP | 2007261479 | A | * | 10/2007 |
| KR | 97026358 | A | * | 6/1997 |
| KR | 101317082 | B1 | * | 10/2013 |

* cited by examiner

SECURING ARRANGEMENT FOR FITTING A FOOT MAT

CROSS-REFERENCE TO RELATED APPLICATION

This application claims foreign priority benefits under 35 U.S.C. § 119(a)-(d) to DE Application 10 2016 205 291.8 filed Mar. 31, 2016, which is hereby incorporated by reference in its entirety.

TECHNICAL FIELD

The disclosure relates to a securing arrangement for fitting a foot mat to the floor of the foot space of a motor vehicle.

BACKGROUND

Foot mats or floor mats are generally placed in the foot space of motor vehicles in order to protect the floor from dirt and damage. However, such foot mats can slip, which may lead to safety risks, in particular at the driver side, if foot mats are able to move below the pedals. This is particularly significant even if the foot mat could only partially block a brake pedal. Therefore, foot mats are advantageously fixed to the floor. To this end, corresponding securing elements are provided on the floor and/or on the foot mat. The main purpose of such securing elements is to prevent a movement of the foot mat. In this instance, however, such a securing element may also bring about a high retention force in the direction of the floor in order, when the foot mat is removed, to produce an impression of high quality.

For example, it is possible to use as securing elements hook and loop fasteners or push-buttons. In this instance, it is known to provide on the floor a plurality of securing elements which have an upper push-button which can be pressed into a corresponding opening on a foot mat. In order to fit such a securing element to the floor, EP 0 211 966 A1 proposes, for example, providing two claw-like fingers on the securing element, by means of which the securing element can be screwed into a carpet provided in the floor region and can be fixed by means of the claws. However, the carpet is thereby damaged and the securing elements can also become loose again by means of rotation in the opposite direction. If they are screwed in again, this contributes to further damage to the carpet.

U.S. Pat. No. 5,384,939 describes in contrast a securing element for floor mats which is securely screwed into the floor. In this instance, the securing element comprises two components. A lower portion is screwed into the floor and an upper portion is connected to a foot mat by means of a clamping device. The two components each have a coupling face on which a plurality of coupling elements are constructed. These coupling elements are formed by means of pins having heads which interlock with each other when the two coupling faces are pressed against each other. Thus, in order to fit the foot mat to the floor by means of the coupling elements as in a hook and loop fastening, a releasable connection is produced between the lower portion and the upper portion. When the foot mat is released, the lower portion remains screwed in the floor whilst the upper portion is removed with the foot mat. However, in particular screwing securing portions into the floor is disadvantageous or under some circumstances not possible at all with floors with a small thickness and/or low rigidity.

US 2009/0235485 A1 describes a securing system for foot mats, in which a two-component securing element is provided on the foot mat and on the floor, respectively. The two components of the securing element of the floor receive the floor in a sandwich-like manner between them and the same provision is made for the securing element of the foot mat. The securing element of the floor formed in this manner can be introduced into an opening in the securing element of the foot mat in order to then rotate a locking element, whereby a connection is produced between the two securing elements. U.S. Pat. No. 8,690,222 B2 describes in contrast two-portion securing elements for foot mats, in which an upper portion can be screwed into a lower portion.

FR 2919540 A1 further discloses a securing element for fitting to the floor which has an upper portion which is constructed to fit the foot mat. This upper portion has a pin which is guided through an opening in the floor. At the rear side of the floor, there is provided a disc which receives the pin in an opening. By means of teeth on the outer side of the pin, the pin can be engaged in different positions with the disc in order to thus clamp the floor between the upper portion and the disc.

Furthermore, in the field of the connection of very thin material webs there are known securing elements which provide in the region of the securing an additional reinforcement in order when the securing elements are separated to prevent damage to the material webs. For example, GB 2 190 130 A discloses such securing elements.

The securing of mats in the foot space of motor vehicles still leaves room for improvement.

SUMMARY

A securing arrangement for releasably fitting a foot mat to the floor of the foot space of a motor vehicle is described herein, in which the foot mat is secured against slipping, wherein the securing arrangement can be used in particular even with floors with a small thickness and/or rigidity.

It should be noted that the features and measures set out individually in the following description can be combined with each other in any technically advantageous manner and set out other embodiments. The description additionally characterizes and specifies the disclosure in particular in connection with the Figures.

The securing arrangement for fitting a foot mat to the floor of the foot space of a motor vehicle uses at least one securing element which can be fixed to the floor. This securing element has at least three portions. On the one hand, it has an upper portion which is constructed for releasably fitting the foot mat. To this end, the upper portion can be constructed in different manners. For example, it may have a push-button whose head can be pressed into a ring in the foot mat. However, other connection mechanisms may also be used, such as, for example, foldable hooks, hook and loop fastenings, etcetera.

The upper portion further has a pin which can be guided through an opening in the floor. The pin protrudes in this instance out of the opening at the side of the floor opposite the upper portion.

The securing element has as an additional, therefore second, portion, a clamping element which can be connected, for example, locked to the pin at this side of the floor facing away from the upper portion. The floor is thus clamped between the upper portion and the clamping element.

The securing element further has as an additional, therefore third, portion at least one reinforcement plate which is arranged between the clamping element and the floor. The reinforcement plate is pressed by the clamping element against the floor and stabilizes it in this region. The securing arrangement is therefore particularly suitable for floors with a low rigidity and/or small thickness. For example, the securing arrangement is suitable for motor vehicles with thin rubber floors in the foot space. Particularly when the foot mat is released from the upper portion of the securing element, this leads to there being no occurrences of deformation of the floor since the tensile force applied for this purpose is distributed over a larger surface-area than would be the case without an additional reinforcement plate. The securing element connected to the floor is not also lifted, which would lead to a bulging of the floor, but instead the entire region of the securing arrangement remains stable and secure. This in turn advantageously increases the impression of quality which a user of the vehicle gains when a foot mat is released from the securing arrangement. A lateral removal of the foot mat is also possible without the securing element tilting or rotating. This could otherwise lead to damage to the floor, in particular in the region of the opening.

In an embodiment, the reinforcement plate has at least one mandrel at the side facing the floor. Preferably, there are provided a large number of mandrels which, after the clamping element has been fitted, press from below into the material of the floor. In this manner, the reinforcement plate is fixed with respect to the floor so that the securing element is generally fixed in the floor in the region of the opening. This measure additionally reduces the risk of damage in the edge region of the opening.

A reinforcement plate may be constructed in different manners. For example, it may be a rectangular, circular or semi-circular plate which is arranged in the region of the pin of the upper portion. Furthermore, there may also be provided a plurality of reinforcement plates which are arranged around the pin and which are pressed by the clamping element against the floor. If a reinforcement plate is provided with the mandrels described, one or more of these plates may be placed in an appropriate manner outside the opening in the floor and pressed with the mandrels thereof securely into the material of the floor. Subsequently, the reinforcement plates are fixed with the clamping element. In one embodiment, however, there is used only one reinforcement plate which has an opening through which the pin is guided. The reinforcement plate is then a flat ring which surrounds the pin.

The size of the reinforcement plate is selected in such a manner that it provides sufficient reinforcement for a specific application field, that is to say, for a specific floor. In particular the reinforcement plate preferably covers a larger region than the upper portion in this instance. If the upper portion has, for example, a base with which it is in abutment against the floor via an abutment face, the reinforcement plate is preferably in abutment against the floor at the opposite side of the floor with a contact face which is at least as large as the abutment face of the upper portion. Preferably, the contact face of the reinforcement plate is larger than the abutment face of the upper portion. Consequently, the reinforcement plate supports the securing region at least in the region of the upper portion, but preferably even therebeyond.

The clamping element may also be constructed in different manners. Preferably, it involves one or more resilient elements which can be connected, that is to say, for example, locked to the pin, wherein they are supported at the same time on the reinforcement plate. In this manner, such a clamping element presses the reinforcement plate against the floor. For example, the clamping element is constructed as a spring washer with an opening through which the pin is guided. The spring washer is then in a first embodiment clamped on the pin between the reinforcement plate and a locking element. To this end, the spring washer is preferably formed in a funnel-shaped manner and can be axially compressed in order to thus produce a resilient force in the opposite direction.

The locking element may be formed by a cross-sectional increase at the end of the pin. There is thus formed on the pin a peripheral locking step on which the spring washer can be supported. To this end, the inner edge of the spring washer should be resiliently variable in terms of its diameter in order to first expand when the pin is guided through the spring washer. When the smaller cross-section is reached, the inner edge returns to its original shape.

A resiliently variable inner edge of the spring washer may, for example, be achieved in that the edge of the opening of the spring washer has at least two radially extending recesses. At least two flaps are formed which can be pressed apart. In an embodiment, the width of the recesses increases in the direction toward the opening of the spring washer. As a result of an appropriate selection of material, these flaps may be constructed in a resilient manner. To this end, the spring washer may, for example, be formed from a plastics material. The upper portion with the pin and the reinforcement plate may also comprise plastics material.

The pin is preferably cylindrical with a round cross-section. In particular, it may be a hollow cylinder. This reduces the weight and the material costs for the securing element. In the hollow cylinder, however, at least one reinforcement strut may be provided.

However, the spring washer may also be constructed in such a manner that it brings about a self-reinforcing positive-locking connection. This positive-locking connection is produced automatically by the use of a spring washer having thin wall thickness, which bites into the material of the pin, thus becoming embedded in the material of the pin. When the floor material is joined together, there is restoring force produced of the floor material, which acts on the clamping element in such a manner that the inner diameter thereof is reduced. The clamping element may also be a spring washer in this embodiment. The inner front edge of the spring washer thus presses into the pin material so that the clamping element, that is to say, the spring washer, is clamped. In this embodiment, therefore, the restoring force of the floor material brings about the clamping force of the spring washer.

With such a securing mechanism, the three components of the securing element can be connected in a simple manner to each other and thus at the same time also to the floor. The floor is in this instance received in a sandwich-like manner between the upper portion of the securing element and the reinforcement plate. The use of a spring washer as a clamping element has in this instance in particular has the advantage that the securing arrangement can be used on floors with different thicknesses. To this end, the spring washer is compressed to differing degrees. In the first embodiment, at least the flaps which are formed by the recesses in the spring washer are constructed so as to be bent in the direction of the pin. Compared with an embodiment with a rigid washer and a plurality of locking steps on the pin in which the washer can optionally engage, this has the advantage of stepless tensioning.

Other advantageous embodiments of the disclosure are disclosed in the dependent claims and the following description of the Figures, in which:

DETAILED DESCRIPTION

Figure 1:
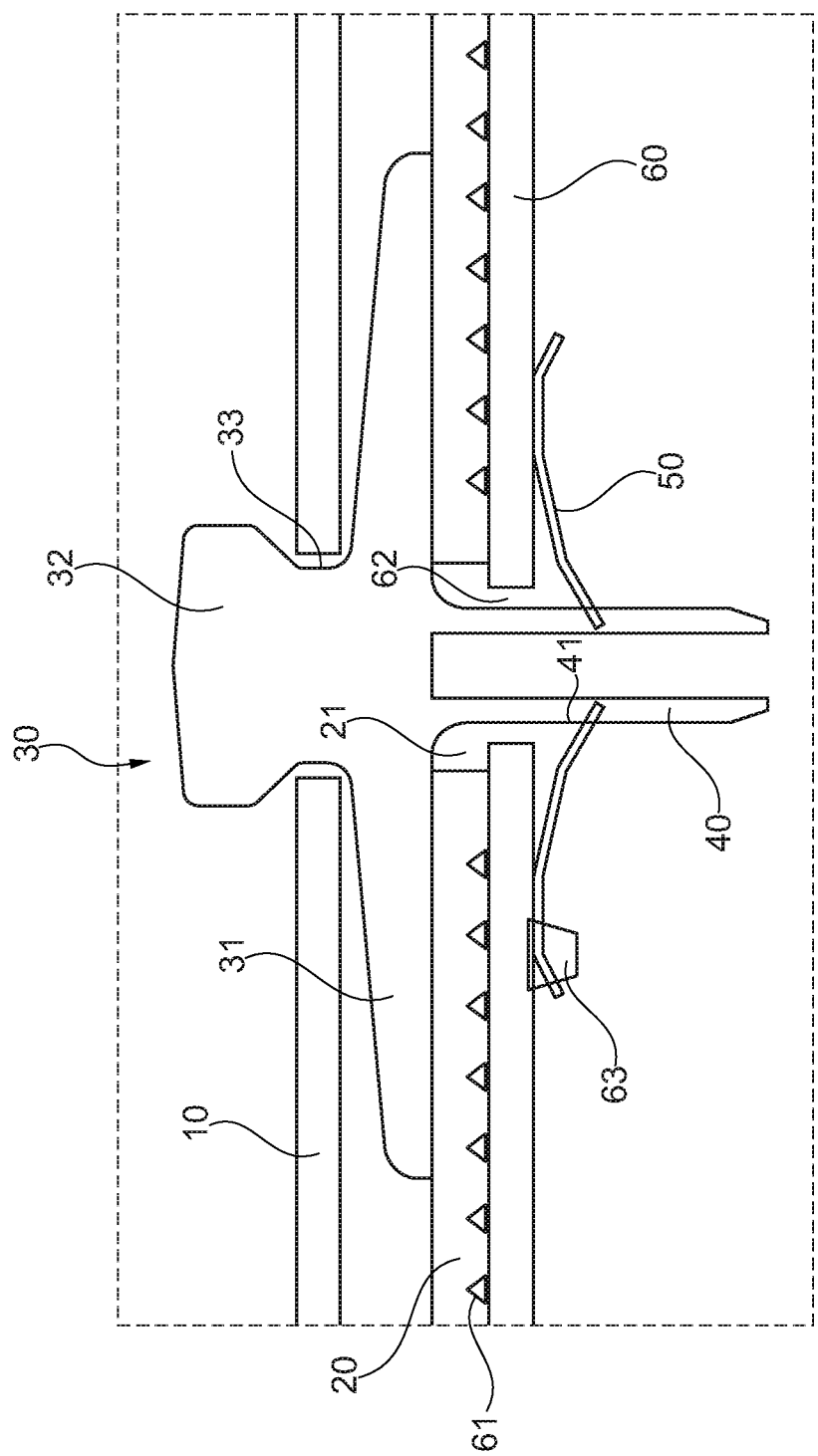
FIG. 1 is a schematic cross-section through an embodiment of a securing arrangement.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different Figures, components which are the same are always given the same reference numerals, for which reason they are also generally only described once.

The embodiment of a securing arrangement shown in FIG. 1 comprises a securing element which comprises at least three portions. A first portion is formed by an upper portion 30 to which a foot mat 10 can be fitted. To this end, the upper portion 30 such as a push-button may have a head 32 having a narrowed portion 33. A foot mat 10 then has a corresponding opening in which the head 32 can be pressed. In this instance, the inner diameter of the opening in the foot mat 10 is smaller than the outer diameter of the head so that the foot mat 10 is retained in the region of the narrowed portion 33 on the upper portion 30 and a specific manual force is required in order to pull the foot mat 10 from the head 32. However, the upper portion 30 may also be constructed differently in order to be able to fit a foot mat thereto.

The upper portion 30 further has a type of collar or base 31 with which the upper portion 30 can be brought into abutment on the floor 20 in the foot space of a motor vehicle. To this end, this abutment face is preferably constructed in a planar manner with the exception of the region of a pin 40. The pin 40 protrudes at the side opposite the head 32 from the base 31 and is guided through an opening 21 in the floor 20. The length of the pin 40 is selected in such a manner that it protrudes from the opening 21 at the lower side of the floor 20. In this region, a clamping element in the form of a spring washer 50 is pushed onto the pin 40 as a second component.

There is located between the spring washer 50 and the floor 20 as a third portion a reinforcement plate 60. This has a plurality of mandrels 61 which are at least partially pressed into the lower side of the floor 20. The spring washer 50 can be connected to the pin 40 or locked to a locking step 41 with the pin 40 (FIG. 2) in such a manner that the floor 20 and the reinforcement plate 60 are clamped between the upper portion 30 and the reinforcement plate 60. In this instance, it can be seen that the reinforcement plate 60 is larger than the abutment face of the base 31 with respect to the floor 20. In the embodiment which can be seen in FIG. 1, it is possible to see another measure in the form of a transport securing device 63 which leads to improved handling during the assembly. It is possible to see a retention projection which is arranged on the reinforcement plate and with which the clamping element 50, that is to say, the spring washer 50, is retained. However, the transport securing device 63 may also be constructed in a point-like, linear or planar manner by means of non-positive-locking or positive-locking connection, wherein embedding in the reinforcement plate, or welding or adhesive-bonding thereto, is also conceivable.

Figure 2:
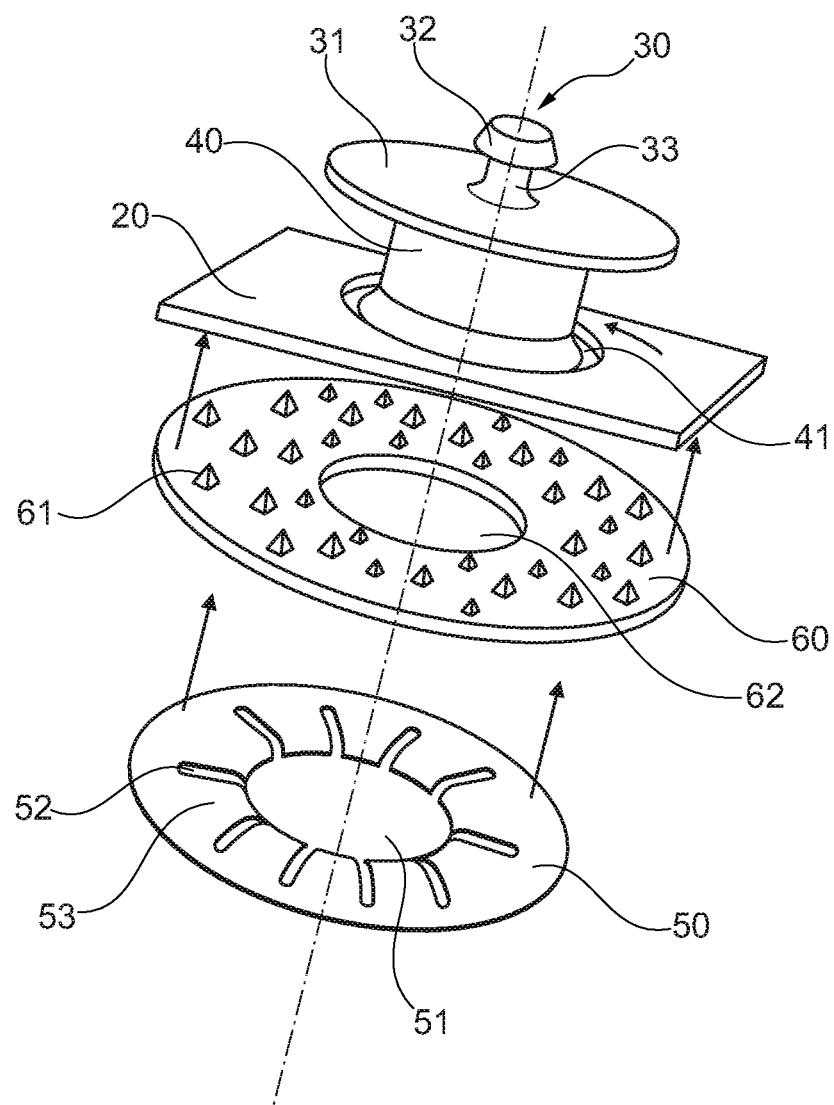
FIG. 2 is a three-dimensional exploded view of the components of another embodiment of a securing arrangement.

FIG. 1 shows the connection only schematically, wherein, however, a more precise illustration of a possible embodiment as an engagement with a locking step 41 can be seen in FIG. 2. In the embodiment illustrated in FIG. 1, the clamping element 50 has such a wall thickness that the inner edge thereof bites into or is embedded in the pin 40. This is brought about by the restoring force of the floor material, that is to say, preferably a soft floor material. During the assembly, the floor material is compressed, whereby the restoring force is produced. This acts on the clamping element 50, that is to say, on the spring washer 50 in such a manner that the inner diameter thereof is reduced so that the free front edge becomes embedded in the pin material, as can be seen in FIG. 1. In this instance, the spring washer 50 is supported on the reinforcement plate 60. The pin may advantageously be formed from a plastics material, that is to say, for example, from a polypropylene (PP) or a polyamide (PA), wherein the clamping element 50, that is to say, the spring washer, may comprise a steel material. In the embodiment according to FIG. 1, a self-reinforcing positive-locking connection is thus brought about.

In this instance, FIG. 2 shows the individual components of a securing arrangement according to another embodiment as a schematic exploded view. The pin 40 on the upper portion 30 has in this instance not yet been introduced into the opening in the floor, but instead is located slightly in front of this opening. In this region, it is possible to see the locking step 41 with which the clamping element 50, that is to say, the spring washer 50, can engage when all the components are assembled.

To this end, the spring washer 50 is constructed in a funnel-like manner with a central opening 51 through which the pin 40 can be guided. The inner edge of the spring washer 50 has a plurality of radially extending recesses 52 by means of which a plurality of flaps 53 are formed on the inner edge. At least these flaps 53 are constructed so as to be bent toward the opening 51. The remaining outer edge of the spring washer 50 may also be constructed so as to be bent in this direction.

The reinforcement plate 60 having a plurality of mandrels 61 is arranged between the floor 20 and the spring washer 50, as can also be seen in the embodiment in FIG. 1. The reinforcement plate 60 of both embodiments is a flat ring with an opening 62 through which the pin 40 of the upper portion 30 can be guided.

If the upper portion 30 is pushed as far as the base 31 through the opening in the floor 20, the pin 40 protrudes with the locking step through the floor 20, the reinforcement plate 60 and the spring washer 50. In this instance, the inner diameter of the opening 51 of the spring washer 50 in the unloaded state substantially corresponds, for example, to the outer diameter of the pin 40 in the region of the smaller diameter thereof. If the pin 40 with the larger outer diameter thereof in the region of the locking step 41 is pushed through the opening 51, the flaps 53 are first pressed outward. As soon as the flaps 53 reach the locking step 41, they can spring back inward again, whereby they engage with the locking step 41. The pin 40 can thus no longer be pulled from the spring washer 50 and a secure connection of all the components is produced. In this instance, the dimensions are selected in such a manner that the spring washer 50 has to be axially compressed in order to engage on the locking step 41. The resilient force required is thus produced in order to press or pull the reinforcement plate 60 and the base 31 securely against the floor at opposite sides. As a result of the bent construction of the flaps 53, this can be carried out at least in a specific region with different thicknesses of floor. In contrast, in the embodiment of FIG. 1, the restoring force of the floor material is decisive for the embedding of the spring washer in the pin and the clamping of the components.

Figure 3:
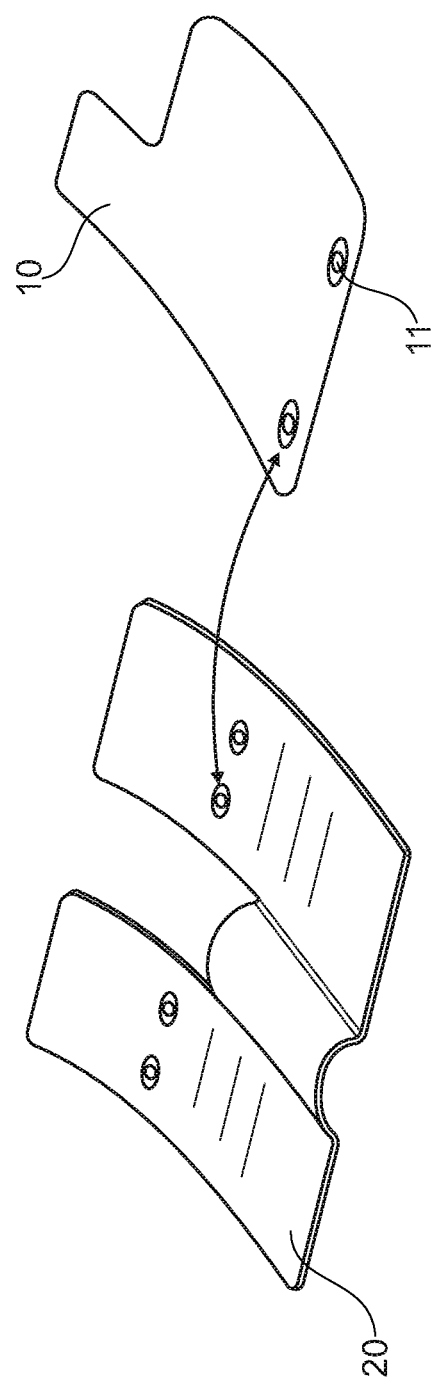
FIG. 3 is a schematic view of a floor in the foot space of a motor vehicle with a foot mat which is intended to be fitted.

FIG. 3 is a schematic illustration of a floor 20 in the foot space of a motor vehicle, wherein, for example, the driver side and the passenger side are shown. In both regions, there are fitted to the floor at least two securing elements, to the protruding upper portions of which a foot mat 10 can be fitted. To this end, the foot mat 10 has two openings which are preferably provided with a ring 11 in order to form in the textile foot mat a fixed border through which the heads of the securing elements can be pressed. As already mentioned, however, the fitting of a foot mat to the upper portion of a securing element may also be carried out using other securing mechanisms. Furthermore, foot mats may also be fixed to the floor using more than two securing elements.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A securing arrangement for fitting a foot mat to a floor of a foot space of a motor vehicle, comprising:
   at least one securing element having an upper portion which is constructed for releasable fitting of a foot mat to a floor of a vehicle,
   a pin connected to the upper portion of the at least one securing element, and the pin configured to be received by an opening defined by the floor,
   a clamping element defining a clamping opening configured to receive the pin opposite of the upper portion, the clamping element having at least two radially extending recesses from the opening, wherein a width of the recesses increases in a direction toward the clamping opening,
   at least one reinforcement plate arranged between the clamping element and the floor to retain the mat on the floor; and
   a securing projection arranged on the reinforcement plate to further secure the clamping element to the reinforcement plate.

2. The securing arrangement of claim 1, wherein the reinforcement plate has at least one mandrel arranged at a side facing the floor to engage the floor.

3. The securing arrangement of claim 1, wherein the reinforcement plate defines an opening configured to receive the pin.

4. The securing arrangement of claim 1, wherein the upper portion has a base configured to abut the floor, and the reinforcement plate abuts the floor at an opposite side of the base.

5. The securing arrangement of claim 1, wherein the clamping element is a spring washer defining the clamping opening configured to receive the pin, and the spring washer includes an inner front edge around the opening to engage the pin against the reinforcement plate.

6. The securing arrangement of claim 1, wherein the clamping element is a spring washer defining a clamping opening configured to receive the pin.

7. The securing arrangement of claim 1 further comprising a locking element arranged around the pin, wherein the locking element has a larger diameter than the pin.

8. The securing arrangement of claim 1, wherein the pin is a hollow cylinder.

9. A securing arrangement for fitting a foot mat to a floor of a motor vehicle, comprising:
   a securing element having a pin extending from an upper portion;
   a clamping element defining an opening for receiving the pin; and
   at least one reinforcement plate arranged between the clamping element and the floor to retain the mat on the floor; and
   a securing projection arranged on the reinforcement plate to further secure the clamping element to the reinforcement plate.

10. The securing arrangement of claim 9, wherein the reinforcement plate has at least one mandrel arranged at a side facing the floor to engage the floor.

11. The securing arrangement of claim 9, wherein the reinforcement plate defines an opening configured to receive the pin.

12. The securing arrangement of claim 9, wherein the upper portion has a base configured to abut the floor and the reinforcement plate abuts the floor at an opposite side of the base.

13. The securing arrangement of claim 9, wherein the clamping element is a spring washer defining the opening configured to receive the pin, and the spring washer includes an inner front edge around the opening to engage the pin against the reinforcement plate.

14. The securing arrangement of claim 9, wherein the clamping element is a spring washer defining a clamping opening configured to receive the pin.

15. The securing arrangement of claim 9, wherein the pin is a hollow cylinder.

* * * * *